US012560288B2

(12) United States Patent
Gan et al.

(10) Patent No.: US 12,560,288 B2
(45) Date of Patent: Feb. 24, 2026

(54) AMBIENT LIGHT BAR AND TELEVISION

(71) Applicant: FOSHAN NATIONSTAR OPTOELECTRONICS CO., LTD., Foshan (CN)

(72) Inventors: Jian Gan, Foshan (CN); Danlei Gong, Foshan (CN); Zihao Chen, Foshan (CN); Kun Xu, Foshan (CN); Fabo Liu, Foshan (CN); Weineng Chen, Foshan (CN); Xiang Chen, Foshan (CN); Zhonghai Yan, Foshan (CN)

(73) Assignee: FOSHAN NATIONSTAR OPTOELECTRONICS CO., LTD., Foshan (CN)

(*) Notice: Subject to any disclaimer, the term of this patent is extended or adjusted under 35 U.S.C. 154(b) by 0 days.

(21) Appl. No.: 18/985,599

(22) Filed: Dec. 18, 2024

(65) Prior Publication Data

US 2025/0216039 A1 Jul. 3, 2025

(30) Foreign Application Priority Data

Dec. 29, 2023 (CN) ......................... 202311862347.2

(51) Int. Cl.
*F21K 9/69* (2016.01)
*F21S 4/28* (2016.01)
(Continued)

(52) U.S. Cl.
CPC .................. *F21K 9/69* (2016.08); *F21S 4/28* (2016.01); *F21V 19/0015* (2013.01);
(Continued)

(58) Field of Classification Search
CPC ...... F21K 9/69; F21K 9/20; F21S 8/00; F21S 4/20; F21S 4/28; F21S 4/22; F21S 4/24; F21S 4/26; F21S 8/03; F21V 19/00; F21V 19/0015; F21V 33/0052; F21V 21/08; F21V 21/0808; F21V 21/088; F21V 21/096; H04N 5/64; H10H 29/20; H10H 29/24; H10H 29/80; H10H 29/8321;
(Continued)

(56) References Cited

U.S. PATENT DOCUMENTS 5,893,633 A * 4/1999 Uchio .................. H10H 20/855
362/240
11,566,775 B1 * 1/2023 Lanoye .............. G02B 19/0066
(Continued)

FOREIGN PATENT DOCUMENTS

WO WO-2013050340 A1 * 4/2013 ................ F21S 4/28

*Primary Examiner* — Erin Kryukova
(74) *Attorney, Agent, or Firm* — CM Law; Stephen J. Weed

(57) ABSTRACT

An ambient light bar includes: a printed circuit board (PCB) board; at least one beveled light emitting diode (LED) bead group and a lens assembly. The beveled LED bead group includes at least two beveled LED beads, and the at least two beveled LED beads are fixed on the PCB board according to a preset arrangement. A bevel angle is formed between a chip mounting face and a welding plane of each of the beveled LED beads, and the bevel angles of the at least two beveled LED beads are different. The lens assembly is covered above a light output side of the beveled LED bead group and is fixed on the PCB board.

19 Claims, 7 Drawing Sheets

(51) Int. Cl.
*F21V 19/00* (2006.01)
*F21V 33/00* (2006.01)
*F21Y 105/10* (2016.01)
*F21Y 115/10* (2016.01)

(52) U.S. Cl.
CPC ....... *F21V 33/0052* (2013.01); *F21Y 2105/10* (2016.08); *F21Y 2115/10* (2016.08)

(58) Field of Classification Search
CPC ........... H10H 29/8506; H10H 29/8508; H10H 29/855; H01L 25/0753; F21Y 2107/50
See application file for complete search history.

(56) References Cited

U.S. PATENT DOCUMENTS

2008/0094824 A1* 4/2008 Stack ...................... A47F 3/001
362/125
2011/0194274 A1* 8/2011 Kwisthout .......... F21V 33/0052
362/97.1
2018/0073720 A1* 3/2018 Bruyneel .............. F21V 7/0008

* cited by examiner

AMBIENT LIGHT BAR AND TELEVISION

CROSS-REFERENCE TO RELATED APPLICATIONS

This application claims the priority of a Chinese Patent Application No. 202311862347.2, filed on Dec. 29, 2023, the disclosure of which is incorporated herein by reference in its entirety.

TECHNICAL FIELD

This application relates to the field of LED technology, and in particular to an ambient light bar and a television.

BACKGROUND

As an important broadcasting and video communication tool, television (TV) has become one of the essential electrical appliances in modern life. In recent years, since the ambient light can be synchronized with the color of the TV screen, reduce the eye strain caused by watching TV and produce an immersive viewing experience, it has attracted more and more attention.

Referring to FIG. 1, the conventional ambient light generally includes a light bar 1' and a control unit (not shown). The light bar 1' is fixed on edges of the back panel 2' of the TV, and the control unit is electrically connected to the light bar 1'. As shown in FIG. 2, the light bar 1' includes a substrate 11' and light emitting diode (LED) lights 12' arranged on the substrate 11' at intervals. However, when the conventional LED lights are used for ambient lights, there will be problems such as single color level and small coverage.

SUMMARY

Based on this, an object of the present application is to provide an ambient light bar and a television.

In a first aspect, an ambient light bar is provided according to the present application, which includes: a printed circuit board (PCB) board: at least one beveled light emitting diode (LED) bead group and a lens assembly.

Each of the at least one beveled LED bead group includes at least two beveled LED beads, and the at least two beveled LED beads are fixed on the PCB board according to a preset arrangement. A chip mounting face and a welding plane of each of the beveled LED beads form a bevel angle, and bevel angles of the at least two beveled LED beads are different.

The lens assembly is covered above at a light output side of the beveled LED bead group and is fixed on the PCB board.

In some embodiments, the beveled LED bead group includes four beveled LED beads, and bevel angles of the beveled LED beads are 35°, 60°, 50° and 20°, respectively.

In some embodiments, the beveled LED beads are arranged in a straight line shape or a rectangular shape.

In some embodiments, the beveled LED beads are arranged at intervals in a straight line shape in an order of the bevel angles of 35°, 60°, 50° and 20°.

In some embodiments, the beveled LED beads are arranged in two rows and two columns. In a row direction, the beveled LED bead with the bevel angle of 20° is arranged at an interval from the beveled LED bead with the bevel angle of 50°. In a column direction, the beveled LED bead with the bevel angle of 20° is arranged at an interval from the beveled LED bead with the bevel angle of 35°.

In some embodiments, the lens assembly includes a base, at least two bosses and at least two lenses. Each of the bosses is provided with at least one opening, each of the lenses is fixed on an upper surface at an opening of a corresponding boss, and the beveled LED beads are located in openings of the bosses, respectively. Angles formed by the base and upper surfaces of the bosses are not equal, and curvatures of the lenses are different.

In some embodiments, the lens assembly includes a first boss, a second boss, a third boss, a first lens, a second lens, a third lens and a fourth lens.

The first boss is provided with a first opening, the first lens is fixed on an upper surface at the first opening of the first boss, and the beveled LED bead with the bevel angle of 35° is located in the first opening of the first boss.

The second boss is provided with a second opening and a third opening. The second lens is fixed on an upper surface at the second opening of the second boss, and the beveled LED bead with the bevel angle of 60° is located in the second opening of the second boss. The third lens is fixed on an upper surface at the third opening of the second boss, and the beveled LED bead with the bevel angle of 50° is located in the third opening of the second boss.

The third boss is provided with a fourth opening, the fourth lens is fixed on an upper surface at the fourth opening of the third boss, and the beveled LED bead with the bevel angle of 20° is located in the fourth opening of the third boss.

In some embodiments, the PCB board is provided with silk screen information of bevel angles of the beveled LED beads and/or silk screen information of surface mount areas of the lenses.

In some embodiments, the PCB board is provided with a through hole, the lens assembly further includes a column foot, and the through hole is configured for the column foot to be inserted.

In some embodiments, the ambient light bar includes at least two beveled LED bead groups.

In some embodiments, the spacing between adjacent beveled LED bead groups ranges from 40 mm to 120 mm.

In some embodiments, the ambient light bar further includes: a fill light unit, located at one side of the at least one beveled LED bead group.

The fill light unit includes at least two beveled LED beads and a lens body, the at least two beveled LED beads of the fill light unit are fixed on the PCB board at intervals according to a preset arrangement. The lens body is covered above a light output side of the beveled LED beads and fixed on the PCB board.

In some embodiments, in the fill light unit, the distance between adjacent beveled LED beads ranges from 3 mm to 10 mm.

In some embodiments, the fill light unit includes four beveled LED beads with bevel angles of 35°, 60°, 50° and 20° respectively, and the four beveled LED beads are arranged at intervals in an order of the bevel angles of 20°, 35°, 50° and 60°. The beveled LED bead with the bevel angle of 60° is arranged close to the at least one beveled LED bead group.

In some embodiments, a plane where a beveled LED bead of the fill light unit is located and a plane where a beveled LED bead of the beveled LED bead group is located form an angle ranging from 15° to 45°.

In some embodiments, the lens body includes: a base; and a boss and four lens spheres which are arranged at a front side of the base. The boss is covered above the beveled LED beads. The boss includes a bevel, the bevel of the boss is provided with four openings, the beveled LED beads are located in the openings of the boss respectively, and the four lens spheres are fixed on upper surfaces at the openings of the boss, respectively.

In a second aspect, a television is provided according to the present application, which includes a screen, a back panel opposite to the screen, and multiple ambient light bars as described above. The multiple ambient light bars are sequentially arranged on left, upper and right edges of the back panel, and the ambient light bars emit light to the outside of the edges of the back panel.

In some embodiments, the back panel includes multiple through holes opened in its panel surface, and the multiple ambient light bars are embedded in the through holes from the inside of the television and protrude from the back panel.

In some embodiments, the fill light unit is located at an intersection area of a left edge and an upper edge of the television and an intersection area of the upper edge and a right edge.

DETAILED DESCRIPTION

In order to make the above-mentioned objects, features and advantages of the present application easier to understand, the embodiments of the present application are described in detail hereinafter in conjunction with the drawings. In the following description, many specific details are explained to facilitate a full understanding of the present application. However, the present application can be implemented in many other ways different from those described herein, and the person skilled in the art can make similar improvements without violating the connotation of the present application, so the present application is not limited by the embodiments disclosed below.

In the ambient light bar of the related art, ordinary LED beads are employed, which have problems such as single color level and small coverage. In view of this, an LED light source module is proposed according to the present application, which includes at least two beveled LED beads, a chip mounting face and a welding plane of each beveled LED bead form a bevel angle, and the bevel angles of at least two beveled LED beads are different, which can expand the light output range, and can perform color control on different light output areas separately, so as to achieve a multi-leveled colored ambient light.

The following is a further description of embodiments of the present application in conjunction with the drawings.

Embodiment One

Figure 1:
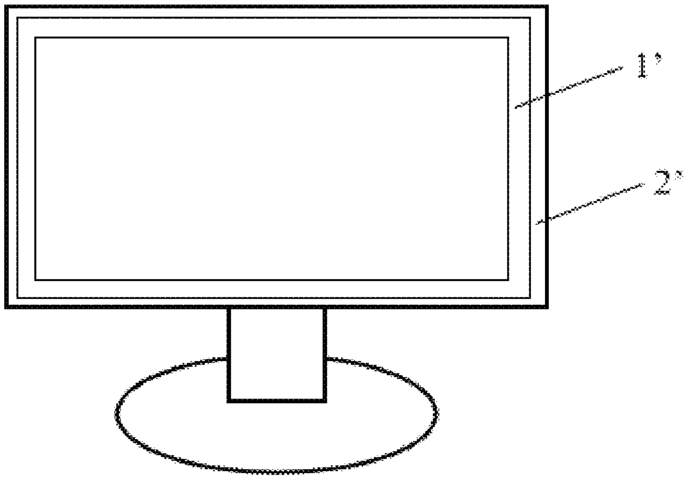
FIG. 1 is a schematic diagram of a conventional TV ambient light.
Figure 2:
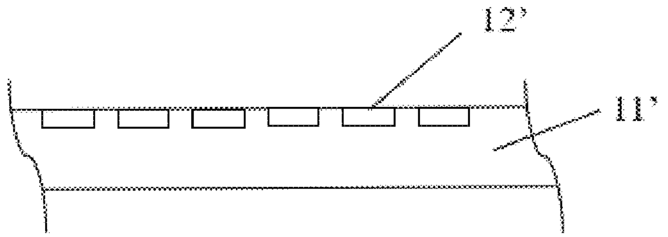
FIG. 2 is a schematic diagram of a conventional TV ambient light.
Figure 3:
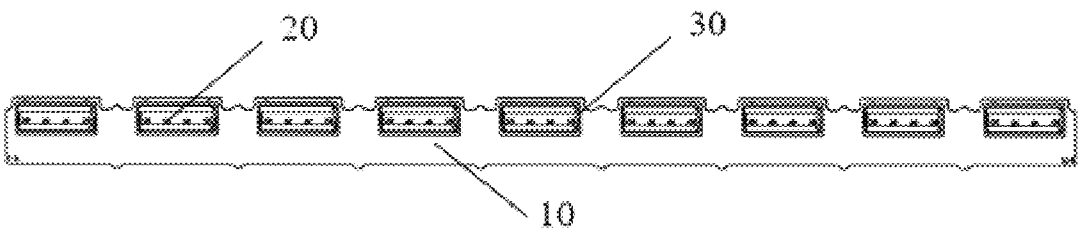
FIG. 3 is a schematic structural diagram of an ambient light bar according to an embodiment of the present application.

Referring to FIG. 3, an ambient light bar according to this embodiment includes a printed circuit board (PCB) board 10, nine beveled LED bead groups 20 and nine lens assemblies 30 corresponding to the nine beveled LED bead groups 20. The nine beveled LED bead groups 20 are arranged at intervals on the PCB board 10, and each lens assembly 30 is covered above a light output side of a corresponding beveled LED bead group 20.

Figure 4:
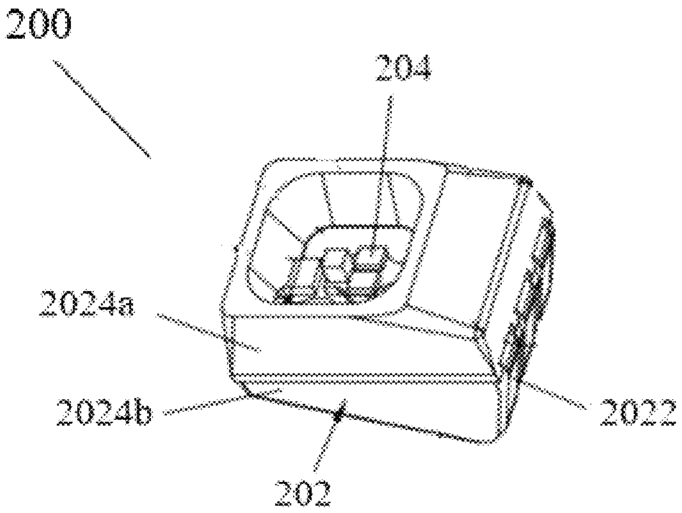
FIG. 4 is a schematic structural diagram of a beveled LED bead according to an embodiment of the present application.
Figure 5:
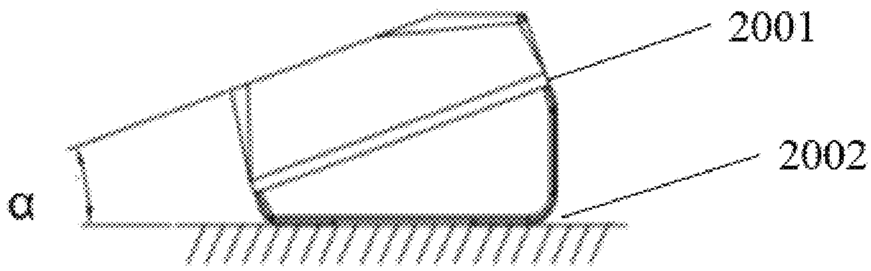
FIG. 5 is a schematic side view of a beveled LED bead according to an embodiment of the present application.
Figure 6:
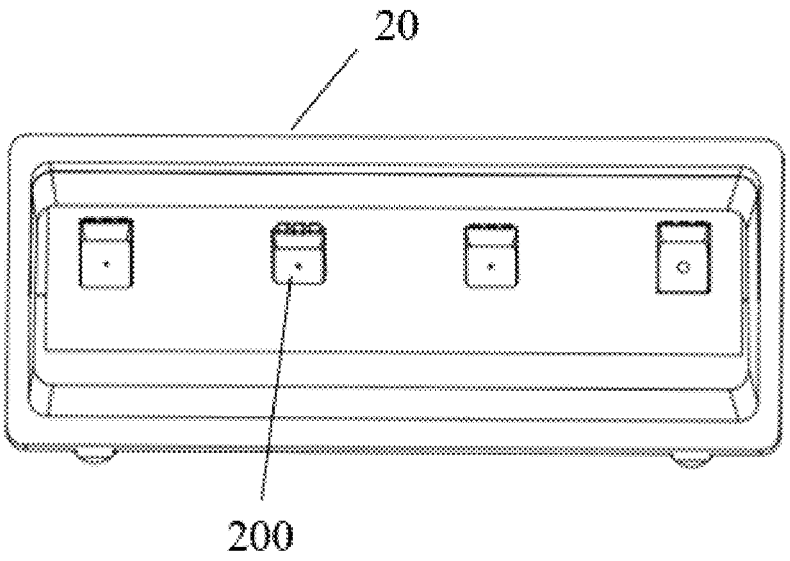
FIG. 6 is a schematic diagram of a beveled LED bead group according to an embodiment of the present application.

The beveled LED bead group 20 includes four beveled LED beads 200 with different bevel angles. Referring to FIG. 4, the beveled LED bead 200 includes an LED bead bracket 202 and a light emitting diode (LED) chip 204. The LED bead bracket 202 includes a bracket body and a metal bracket 2022 embedded in the bracket body. The bracket body is divided by the metal bracket 2022 into a cup cover **2024*a* located at a top side and a support structure 2024*b* located at a bottom side. A cup bottom within the cup cover 2024*a* is provided with a chip mounting face 2001 parallel to a top surface of a cup mouth of the cup cover 2024*a*. The bottom of the support structure 2024*b* is provided with a welding plane 2002, and the welding plane 2002 is electrically connected to the chip mounting face 2001 through the metal bracket 2022. A bevel angle is formed between the chip mounting face 2001 and the welding plane 2002, which is indicated by the mark a in FIG. 5. The LED chip 204 is arranged on the chip mounting face 2001 in the cup cover 2024*a*. Referring to FIG. 6, in the beveled LED bead group 20**, the four beveled LED beads are arranged in a "straight line" in the order of bevel angles of 35°, 60°, 50° and 20°. Specifically, the spacing between adjacent beveled LED beads is 10 mm, which can reduce the mixed light crosstalk between the beveled LED beads.

Figure 7:
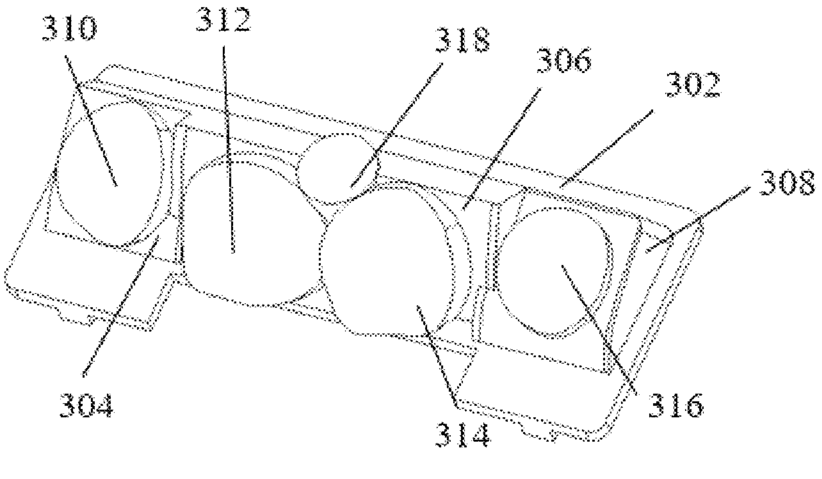
FIG. 7 is a schematic structural diagram of a lens assembly according to an embodiment of the present application.
Figure 8:
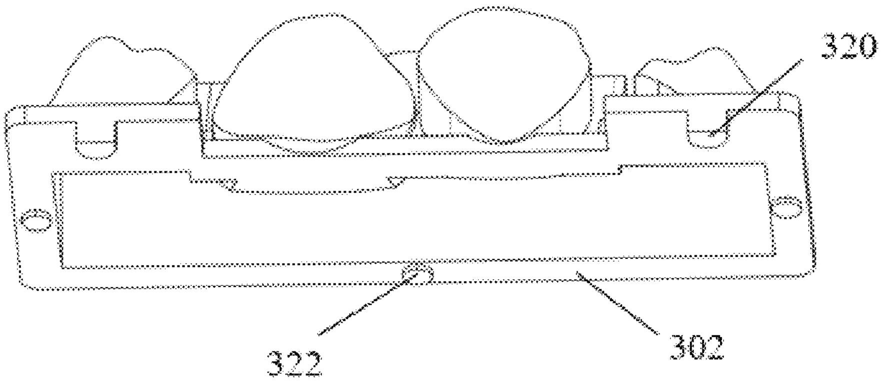
FIG. 8 is a schematic side view of a lens assembly according to an embodiment of the present application.
Figure 9:
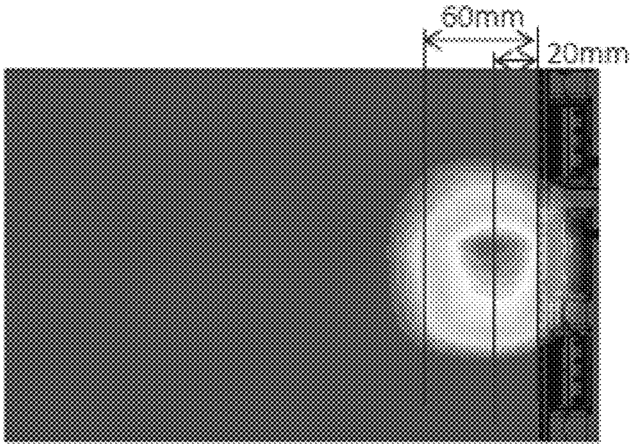
FIG. 9 is a diagram of optical simulation result of a beveled LED bead with a bevel angle of 60° according to an embodiment of the present application.
Figure 10:
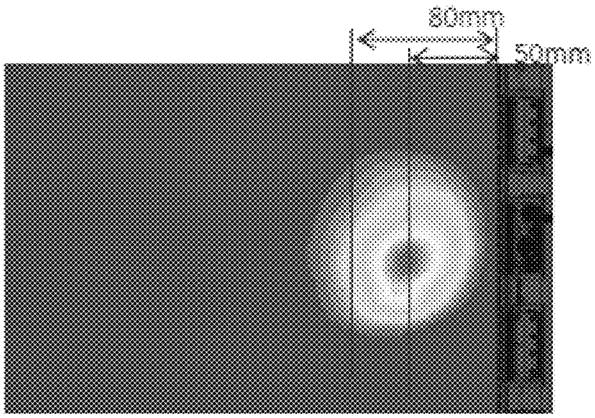
FIG. 10 is a diagram of optical simulation result of a beveled LED bead with a bevel angle of 50° according to an embodiment of the present application.
Figure 11:
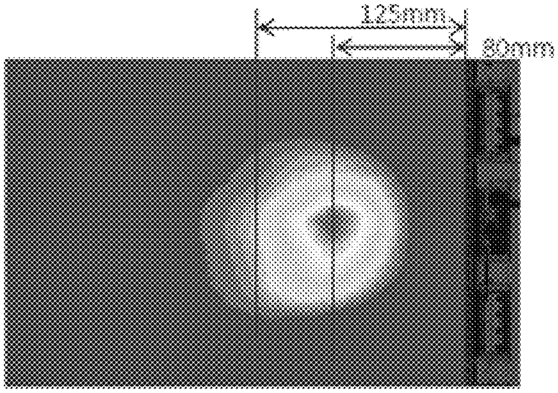
FIG. 11 is a diagram of optical simulation result of a beveled LED bead with a bevel angle of 35° according to an embodiment of the present application.
Figure 12:
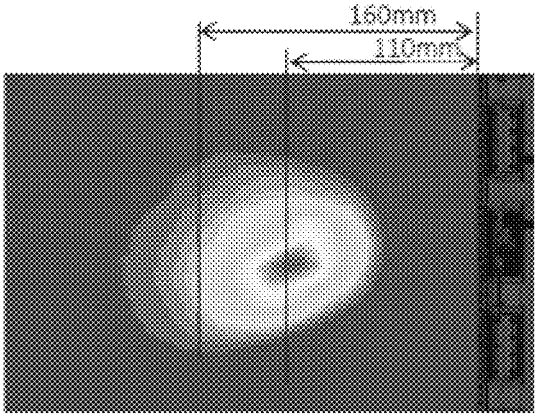
FIG. 12 is a diagram of optical simulation result of a beveled LED bead with a bevel angle of 20° according to an embodiment of the present application.

Referring to FIG. 7 and FIG. 8, the lens assembly 30 includes a base 302, a first boss 304, a second boss 306, a third boss 308, a first lens 310, a second lens 312, a third lens 314, a fourth lens 316, an adsorption column 318 arranged at a front side of the base 302, two column feet 320 arranged on a back side of the base 302 and three lens feet 322 arranged on the back side of the base 302. The top of the adsorption column 318 is a circular plane with a diameter of 5 mm, which is convenient to be absorbed by the nozzle of the mounting equipment, thereby achieving efficient mounting.

The first boss 304 is covered above the beveled LED bead with the bevel angle of 35°, and is provided with a first opening. A first angle is formed between an upper surface of the first boss 304 and the base 302. The beveled LED bead with the bevel angle of 35° is located in the first opening of the first boss 304. The first lens 310 is fixed on an upper surface at the first opening of the first boss 304, and is configured to converge and shape the light beam emitted by the beveled LED bead with the bevel angle of 35° to form a first light spot.

The second boss 306 is covered above the beveled LED beads with bevel angles of 60° and 50°, and is provided with a second opening and a third opening. A second angle is formed between an upper surface of the second boss 306 and the base 302. The beveled LED bead with the bevel angle of 60° is located in the second opening of the second boss 306, and the beveled LED bead with the bevel angle of 50° is located in the third opening of the second boss 306. The second lens 312 is fixed on an upper surface at the second opening of the second boss 306, and is configured to converge and shape the light beam emitted by the beveled LED bead with the bevel angle of 60° to form a second light spot. The third lens 314 is fixed on an upper surface at the third opening of the second boss 306, and is configured to converge and shape the light beam emitted by the beveled LED bead with the bevel angle of 50° to form a third light spot.

The third boss 308 is covered above the beveled LED bead with the bevel angle of 20°, and is provided with a fourth opening. A third angle is formed between an upper surface of the third boss 308 and the base 302. The beveled LED bead with the bevel angle of 20° is located in the fourth opening of the third boss 308. The fourth lens 316 is fixed on an upper surface at the fourth opening of the third boss 308, and is configured to converge and shape the light beam emitted by the beveled LED bead with the bevel angle of 20° to form a fourth light spot.

Specifically, the first angle formed by the first boss 304 and the base 302, the second angle formed by the second boss 306 and the base 302, and the third angle formed by the third boss 308 and the base 302 are not equal, and the curvatures of the first lens 310, the second lens 312, the third lens 314 and the fourth lens 316 are different, respectively matching the corresponding beveled LED beads, so that each beveled LED bead irradiates the emitted light to the selected area and direction. Referring to FIG. 9 to FIG. 12, the center position of the second light spot formed by the beveled LED bead with the bevel angle of 60° is 20 mm above the ambient light bar, the center position of the third light spot formed by the beveled LED bead with the bevel angle of 50° is 50 mm above the ambient light bar, the center position of the first light spot formed by the beveled LED bead with the bevel angle of 35° is 80 mm above the ambient light bar, and the center position of the fourth light spot formed by the beveled LED beads with the bevel angle of 20° is 110 mm above the ambient light bar.

Figure 13:
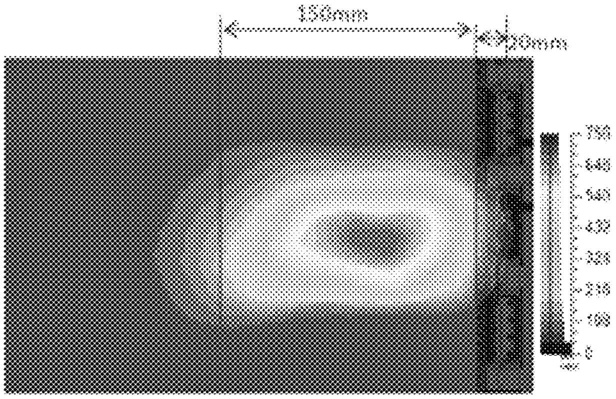
FIG. 13 is a diagram of optical simulation result of a single display unit according to an embodiment of the present application.

The beveled LED bead group 20 and the corresponding lens assembly 30 constitute a display unit. Referring to FIG. 13, since the spacings between center positions of the light spots of the irradiation areas of the four beveled LED beads are evenly 30 mm, the light spots of the irradiation areas of a single display unit can be evenly mixed, and the mutual interference of stray light at the edges of the areas is reduced, the color difference at different positions is avoided, and the pattern of output light is kept rectangular. A spacing between adjacent display units is 60 mm, so that uniform light mixing is achieved between display units.

Figure 14:
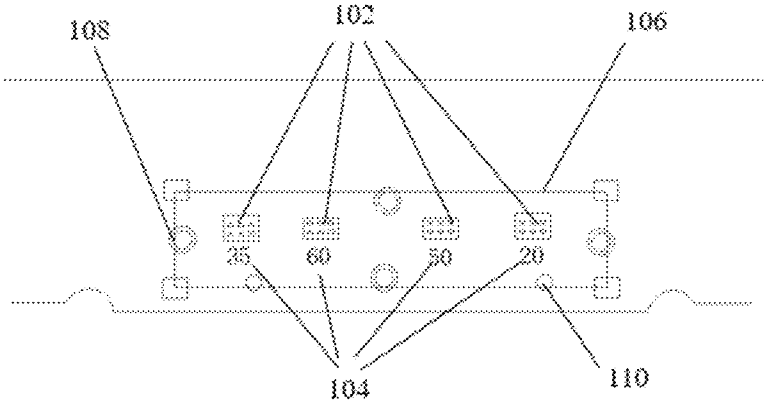
FIG. 14 is a schematic structural diagram of a PCB board according to an embodiment of the present application.

Referring to FIG. 14, the PCB board 10 is provided with silk screen information 102 of surface mount areas of the LED beads, silk screen information 104 of bevel angles of the LED beads, silk screen information 106 of surface mount areas of the lenses, and silk screen information 108 of glue dispensing positions of the lens feet, which facilitates position identification in surface mount of the LED beads and lens. The PCB board 10 is further provided with a through hole 110. When to mount the lens assembly 30, the column foot 320 is inserted into the through hole 110. Therefore, the column foot 320 cooperates with the lens foot 322 to better fix the lens assembly 30 on the PCB board 10.

Compared with the related art, the ambient light bar of the present application includes an assembly of beveled LED beads with different bevel angles, which cooperates with the lens assembly to expand the light output area of the ambient light bar, and can control the color of different light output areas to improve the uniformity of mixed light.

Compared with the related art, the LED light source module of the present application includes at least two beveled LED beads, a chip mounting face of each beveled LED bead and a welding plane form a bevel angle, and the bevel angles of at least two beveled LED beads are different, which can expand the light output range, and can perform color control on different light output areas separately, so as to achieve a multi-leveled colored ambient light.

The present application may have a variety of variant implementations, for example, the spacings of the beveled LED beads in the display unit can be adjusted, and the curvatures of the lens can be adjusted accordingly, and the spacing of adjacent display units can be controlled to be adjusted within the range of 40 mm~120 mm: the number of beveled LED bead groups can be adjusted according to the mounting position of the light bar, and so on.

Further, a television 50 is further provided according to the present application, which includes a screen, a back panel 501 opposite to the screen and multiple ambient light bars. The multiple ambient light bars are sequentially arranged on the left, upper and right edges of the back panel 501, and the ambient light bars are configured to emit light to the outside of the edges of the back panel 501. The back panel 501 includes multiple through holes 502 opened in its panel face, and the multiple ambient light bars are embedded in the through holes 502 from the inside of the television 50 and protrude from the back panel 501, thereby being fixed to the back panel 501.

Embodiment Two

The difference of the ambient light bar of this embodiment two from the ambient light bar of the embodiment one lies in the structure of the beveled LED bead group 20 and the lens assembly 30.

Figure 15:
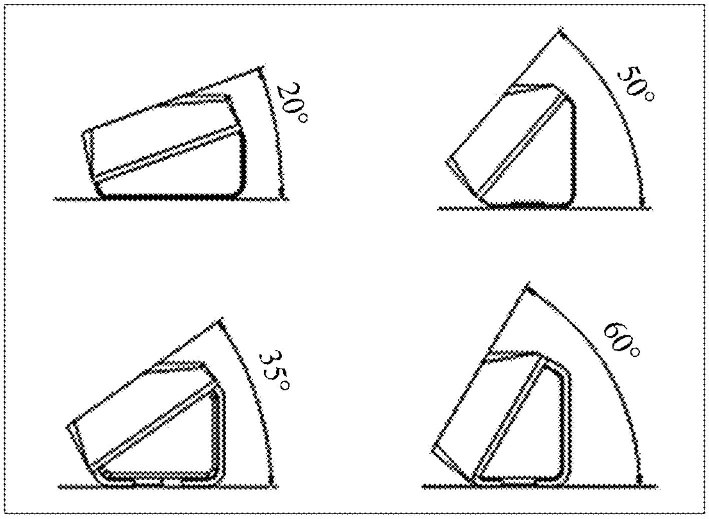
FIG. 15 is a schematic diagram of a beveled LED bead group according to an embodiment of the present application.

Referring to FIG. 15, in this embodiment, the four beveled LED beads are arranged in a character of a rectangular shape. Specifically, the four beveled LED beads are arranged in two rows and two columns. In the row direction, the beveled LED bead with the bevel angle of 20° is arranged at an interval of 12 mm from the beveled LED bead with the bevel angle of 50°, and the beveled LED bead with the bevel angle of 35° is arranged at an interval of 12 mm from the beveled LED bead with the bevel angle of 60°. In the column direction, the beveled LED bead with the bevel angle of 20° is arranged at an interval of 10 mm from the beveled LED bead with the bevel angle of 35°, and the beveled LED bead with the bevel angle of 50° is arranged at an interval of 10 mm from the beveled LED bead with the bevel angle of 60°.

Figure 16:
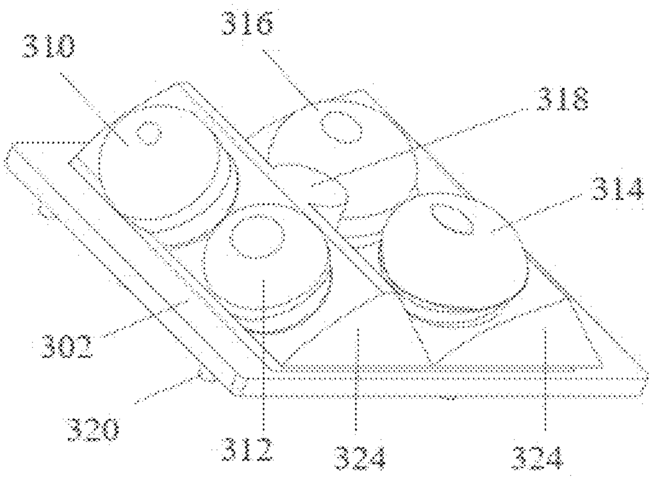
FIG. 16 is a schematic structural diagram of a lens assembly according to an embodiment of the present application.

Referring to FIG. 16, corresponding to the beveled LED bead group 20, the first lens 310, the second lens 312, the third lens 314 and the fourth lens 316 in the lens assembly 30 are also arranged in the character of a rectangular shape. Specifically, the lens assembly 30 includes two bosses 324 arranged front and back, each boss 324 is provided with two openings, and the first lens 310, the second lens 312, the third lens 314 and the fourth lens 316 are respectively fixed on the upper surface at the four openings of the two bosses 324. The four beveled LED beads are respectively located in the four openings of the two bosses 324, so that the light beam emitted by each beveled LED bead forms a light spot after being converged and shaped by the corresponding lens.

Embodiment Three

Figure 17:
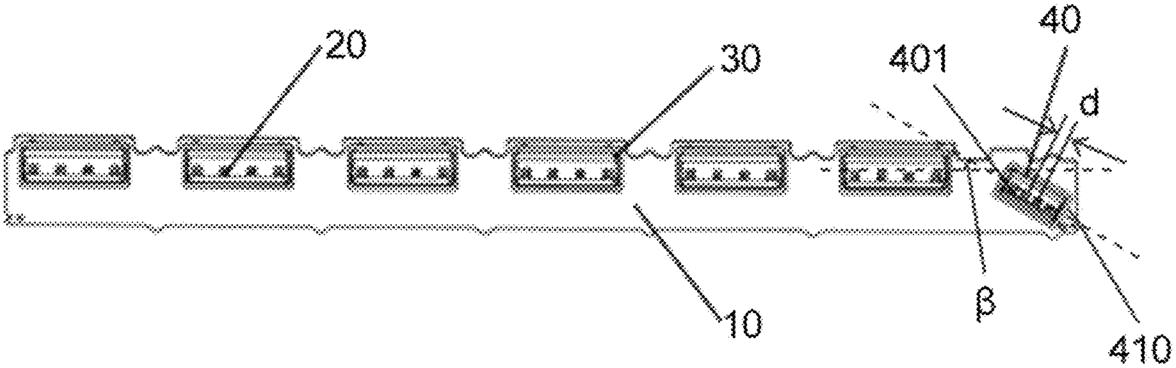
FIG. 17 is a schematic structural diagram of an ambient light bar according to an embodiment of the present application.

The difference of the ambient light bar of this embodiment three from the ambient light bar of the embodiment one lies in that it further includes a fill light unit 40. Referring to FIG. 17, the fill light unit 40 is fixed on the PCB board 10, located at one side of the multiple beveled LED bead groups 20, and is at a spacing of 60 mm from a closest beveled LED bead group 20.

The fill light unit 40 includes four beveled LED beads 401 with bevel angles of 35°, 60°, 50° and 20°, respectively, and a lens body 410. The four beveled LED beads 401 are arranged in a straight line shape at intervals in the order of the bevel angles of 20°, 35°, 50° and 60°. The beveled LED bead with the bevel angle of 60° is arranged close to the beveled LED bead group 20, and the distance between adjacent beveled LED beads 401 ranges from 3 mm to 10 mm.

The lens body 410 structure of the fill light unit 40 is the same as the lens assembly of the embodiment one. Referring to FIG. 7 and FIG. 8, the lens body 410 includes a base, a boss and four lens spheres. The boss and the four lens spheres are arranged at a front side of the base. The boss is covered above the beveled LED beads 401 and includes a top surface and a bevel. The top surface of the boss is parallel to the horizontal plane, which is conducive to surface mount processing and can improve surface mount efficiency. The bevel of the boss is provided with four openings, and the beveled LED beads 401 are located in the openings of the boss respectively, and the four lens spheres are fixed on upper surfaces at the openings of the boss, respectively.

The plane where the beveled LED beads 401 of the fill light unit 40 are located forms an angle with the plane where the beveled LED beads of the beveled LED bead group 20 are located, and cooperates with the lens body 410, to allow the angle between the light output plane of the fill light unit 40 and the light output plane of the beveled LED bead group 20 to range from 15° to 45°, preferably 30°, so that the corners where dark areas are prone to appear can be filled with light to solve the problem of dark areas in corners.

Embodiment Four

The difference of this embodiment four from the embodiment one lies in that the ambient light bar of the TV 50 is different.

Figure 18:
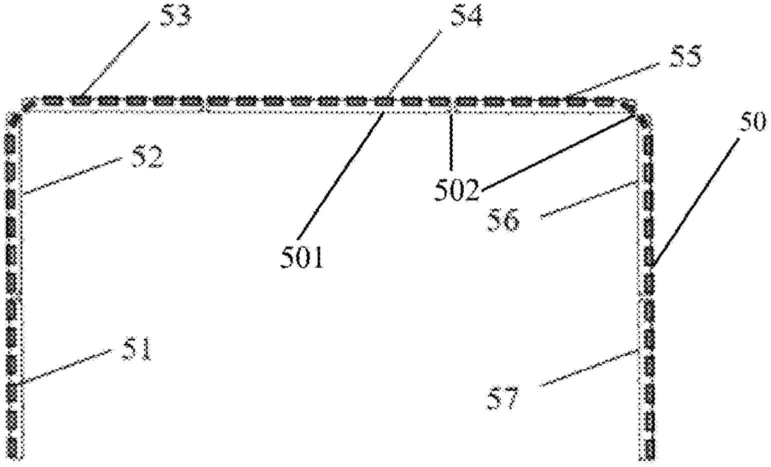
FIG. 18 is a rear view of a TV according to an embodiment of the present application.

Referring to FIG. 18, in this embodiment, the ambient light bar includes a first light bar 51, a second light bar 52, a third light bar 53, a fourth light bar 54, a fifth light bar 55, a sixth light bar 56 and a seventh light bar 57 arranged in sequence. Specifically, the first light bar 51 includes six beveled LED bead groups 20 and is located at a lower part of a left side of the back panel 501 of the TV 50. The second light bar 52 includes six beveled LED bead groups 20 and one fill light unit 40 and is located at an upper part of the left side of the back panel 501 of the TV 50. The third light bar 53 includes six beveled LED bead groups 20 and one fill light unit 40 and is located at a left part of an upper side of the back panel 501 of the TV 50. The fifth light bar 55 includes six beveled LED bead groups 20 and one fill light unit 40 and is located at a right part of the upper side of the back panel 501 of the TV 50. The fourth light bar 54 includes nine beveled LED bead groups 20 and is located between the third light bar and the fifth light bar. The sixth light bar 56 includes six beveled LED bead groups 20 and one fill light unit 40, and is located at an upper part of a right side of the back panel 501 of the TV 50. The seventh light bar 57 includes six beveled LED bead groups 20 and is located at a lower part of the right side of the back panel 501 of the TV 50.

In this embodiment, four fill light units are provided at the intersection area of the left edge and the upper edge as well as the intersection area of the upper edge and the right edge of the back panel 501 of the TV 50, so that the dark areas in the corners are greatly reduced, the obtained illumination is uniform, the brightness is enhanced, and the mixed light crosstalk phenomenon is less.

The present application may have a variety of variant implementations, for example, the number of ambient light bars may be adjusted according to the size of the TV, and the number of beveled LED bead groups in the ambient light bars may also be adjusted.

The technical features of the embodiments described above may be combined arbitrarily. In order to make the description concise, not all possible combinations of the technical features in the above-mentioned embodiments are described. However, as long as there is no contradiction in the combinations of these technical features, the combinations should be considered as the scope of this specification.

The above-mentioned embodiments express several implementations of the present application, and the description is relatively specific and detailed, but it cannot be understood as a limitation on the scope of the patent application. It should be pointed out that for the person of ordinary skill in the art, several modifications and improvements can be made without departing from the concept of the present application, and all the modifications and improvements fall into the scope of protection of the present application. Therefore, the scope of protection of the patent of this application shall be based on the attached claims.

What is claimed is:

1. An ambient light bar, comprising:

a printed circuit board (PCB) board;

at least one beveled light emitting diode (LED) bead group, wherein each beveled LED bead group of the at least one beveled LED bead group comprises at least two beveled LED beads, the at least two beveled LED beads are fixed on the PCB board according to a preset arrangement, a chip mounting face and a welding plane of each of the beveled LED beads form a bevel angle, and bevel angles of the at least two beveled LED beads are different; and at least one lens assembly having a one to one correspondence with the at least one beveled LED bead group, wherein each lens assembly of the at least one lens assembly is covered above a light output side of a respective beveled LED bead group and is fixed on the PCB board.

2. The ambient light bar according to claim 1, wherein each beveled LED bead group comprises four beveled LED beads, and bevel angles of the beveled LED beads are 35°, 60°, 50° and 20° respectively.

3. The ambient light bar according to claim 2, wherein the beveled LED beads are arranged in a straight line shape or a rectangular shape.

4. The ambient light bar according to claim 3, wherein the beveled LED beads are arranged at intervals in a straight line shape in an order of the bevel angles of 35°, 60°, 50° and 20°.

5. The ambient light bar according to claim 3, wherein the beveled LED beads are arranged in two rows and two columns, in a row direction, the beveled LED bead with the bevel angle of 20° is arranged at an interval from the beveled LED bead with the bevel angle of 50°, and in a column direction, the beveled LED bead with the bevel angle of 20° is arranged at an interval from the beveled LED bead with the bevel angle of 35°.

6. The ambient light bar according to claim 2, wherein the lens assembly comprises a base, at least two bosses and at least two lenses, each of the bosses is provided with at least one opening, each of the lenses is fixed on an upper surface at an opening of a corresponding boss, and the beveled LED beads are located in openings of the bosses respectively; and angles formed by the base and upper surfaces of the bosses are not equal, and curvatures of the lenses are different.

7. The ambient light bar according to claim 6, wherein the lens assembly comprises a first boss, a second boss, a third boss, a first lens, a second lens, a third lens and a fourth lens:

the first boss is provided with a first opening, the first lens is fixed on an upper surface at the first opening of the first boss, and the beveled LED bead with the bevel angle of 35° is located in the first opening of the first boss;

the second boss is provided with a second opening and a third opening, the second lens is fixed on an upper surface at the second opening of the second boss, the beveled LED bead with the bevel angle of 60° is located in the second opening of the second boss, the third lens is fixed on an upper surface at the third opening of the second boss, and the beveled LED bead with the bevel angle of 50° is located in the third opening of the second boss;

the third boss is provided with a fourth opening, the fourth lens is fixed on an upper surface at the fourth opening of the third boss, and the beveled LED bead with the bevel angle of 20° is located in the fourth opening of the third boss.

8. The ambient light bar according to claim 7, wherein the PCB board is provided with silk screen information of bevel angles of the beveled LED beads and/or silk screen information of surface mount areas of the lenses.

9. The ambient light bar according to claim 8, wherein the PCB board is provided with a through hole, the lens assembly further comprises a column foot, and the through hole is configured for the column foot to be inserted therein.

10. The ambient light bar according to claim 1, comprising at least two beveled LED bead groups.

11. The ambient light bar according to claim 10, wherein a spacing between adjacent beveled LED bead groups ranges from 40 mm to 120 mm.

12. The ambient light bar according to claim 1, further comprising:

a fill light unit, located at one side of the at least one beveled LED bead group: wherein the fill light unit comprises at least two beveled LED beads and a lens body, the at least two beveled LED beads of the fill light unit are fixed on the PCB board at intervals according to a preset arrangement; and the lens body is covered above a light output side of the at least two beveled LED beads of the fill light unit and fixed on the PCB board.

13. The ambient light bar according to claim 12, wherein in the fill light unit, a distance between adjacent beveled LED beads ranges from 3 mm to 10 mm.

14. The ambient light bar according to claim 12, wherein the fill light unit comprises four beveled LED beads with bevel angles of 35°, 60°, 50° and 20° respectively, the four beveled LED beads are arranged at intervals in an order of the bevel angles of 20°, 35°, 50° and 60°, and the beveled LED bead with the bevel angle of 60° is arranged at a position closest to the at least one beveled LED bead group.

15. The ambient light bar according to claim 12, wherein a plane where a beveled LED bead of the fill light unit is located and a plane where a beveled LED bead of the beveled LED bead group is located form an angle ranging from 15° to 45°.

16. A television, comprising a screen, a back panel opposite to the screen, and a plurality of ambient light bars, wherein the plurality of ambient light bars are sequentially arranged on left, upper and right edges of the back panel, and the ambient light bars emit light to the outside of the edges of the back panel; and wherein each of the plurality of ambient light bars comprises:

a printed circuit board (PCB) board;

at least one beveled light emitting diode (LED) bead group, wherein each beveled LED bead group of the at least one beveled LED bead group comprises at least two beveled LED beads, the at least two beveled LED beads are fixed on the PCB board according to a preset arrangement, a chip mounting face of each of the beveled LED beads and a welding plane of the each of the beveled LED beads form a bevel angle, and bevel angles of the at least two beveled LED beads are different; and at least one lens assembly having a one to one correspondence with the at least one beveled LED bead group, wherein each lens assembly of the at least one lens assembly is covered above a light output side of a respective beveled LED bead group and is fixed on the PCB board.

17. The television according to claim 16, wherein the back panel comprises a plurality of through holes opened in a panel surface of the back panel, and the plurality of ambient light bars are embedded in the through holes from inside of the television and protrude from the back panel.

18. The television according to claim 16, wherein the fill light unit is located at an intersection area of a left edge and an upper edge of the television and an intersection area of the upper edge and a right edge.

19. The television according to claim 17, wherein the fill light unit is located at an intersection area of a left edge and an upper edge of the television and an intersection area of the upper edge and a right edge.

* * * * *